US008818328B2

(12) United States Patent
Kahn (10) Patent No.: US 8,818,328 B2
(45) Date of Patent: Aug. 26, 2014

(54) METHODS AND SYSTEMS FOR BILLING COMMUNICATION (76) Inventor: Ari Kahn, Mount Shasta, CA (US)

( * ) Notice: Subject to any disclaimer, the term of this patent is extended or adjusted under 35 U.S.C. 154(b) by 0 days.

(21) Appl. No.: 13/370,984

(22) Filed: Feb. 10, 2012

(65) Prior Publication Data

US 2013/0210380 A1 Aug. 15, 2013

(51) Int. Cl.
*H04M 11/00* (2006.01)
*H04W 4/24* (2009.01)
*H04W 4/26* (2009.01)
*H04W 4/00* (2009.01)

(52) U.S. Cl.
CPC *H04W 4/24* (2013.01); *H04W 4/26* (2013.01); *H04W 4/00* (2013.01)
USPC ......... 455/406; 455/407; 455/408; 455/414.1

(58) Field of Classification Search
CPC ............ H04W 4/00; H04W 4/24; H04W 4/26
USPC ........... 455/406, 407, 408, 414.1, 414.2, 445; 379/114.21, 114.23, 114.15, 144.01
See application file for complete search history.

(56) References Cited

U.S. PATENT DOCUMENTS

| 7,391,855 | B2* | 6/2008 | Winstead et al. ........ 379/114.21 |
| 7,587,198 | B2* | 9/2009 | Miller ........................ 455/414.2 |
| 7,809,120 | B2* | 10/2010 | Forrest, II ................ 379/114.19 |
| 8,170,188 | B2* | 5/2012 | Bozionek et al. ........ 379/114.01 |
| 8,238,534 | B2* | 8/2012 | Link et al. ................. 379/144.02 |
| 8,243,891 | B2* | 8/2012 | Hodge et al. ............... 379/88.22 |
| 8,340,260 | B1* | 12/2012 | Rae et al. ....................... 379/189 |
| 2003/0198325 | A1 | 10/2003 | Bayne |
| 2009/0023427 | A1 | 1/2009 | Kahn et al. |

FOREIGN PATENT DOCUMENTS

| WO | 2004049690 A1 | 6/2004 |
| WO | 2004100521 A1 | 11/2004 |
| WO | 2005006725 A1 | 1/2005 |
| WO | 2007141762 A1 | 12/2007 |

OTHER PUBLICATIONS

International Preliminary Report on Patentability for PCT/US2010/045666 dated Feb. 14, 2012.

* cited by examiner

*Primary Examiner* — Jean Gelin
(74) *Attorney, Agent, or Firm* — Mark M. Friedman

(57) ABSTRACT

A method, implemented at least in part by a computing device, that can be used to bill a communication. The method includes terminating a teleservice request at an intermediary node, wherein the teleservice request is associated with a sender and a recipient; receiving teleservice content transmitted by the sender, wherein the teleservice content is received at no charge to the sender; receiving a request transmitted by the recipient to access the teleservice content, wherein receiving the request includes charging a fee; and sending the teleservice content to the recipient.

17 Claims, 7 Drawing Sheets

FIG 3. SERVICE INVOCATION (TEXT)

| | | |
|---|---|---|
| A | SMS MO (B) | ORIGINATE SMS TO ?B OR (+)B |
| MSC | FWD_SM | FORWARD SMS TO SMSC |
| SMSC | IF STAR B | IF STAR ROUTE MESSAGE TO NODE C |
| SMSC | ELSE IF A=$0 | IF INSUFFICIENT FUNDS ROUTE TO NODE C |
| C | STORE & LINK | NEW BILLING AND SERVICE TREATMENT |

METHODS AND SYSTEMS FOR BILLING COMMUNICATION

CROSS-REFERENCE TO RELATED APPLICATION

This application is a national phase application of PCT International Application No. PCT/US10/45666 filed Aug. 16, 2010 and claims the benefit under 35 U.S.C. §119(e) of the earlier filing date of U.S. Provisional Application Ser. No. 61/234,250 filed on Aug. 14, 2009, the entire disclosure of which is hereby incorporated by reference herein as if being set forth in its entirety.

FIELD OF THE INVENTION

This application discloses an invention which is related, generally and in various embodiments, to mobile telecommunication methods and systems.

BACKGROUND OF THE INVENTION

The cellular industry billing protocol and standard is Calling and Sending Party Pays (CPP) as there are many technical, commercial and social challenges to successfully deploying Receiving Party Pays (RPP) services. Notwithstanding, there are approximately three billion people that cannot afford cellular services. Thus, the future of this industry hinges on delivering a frictionless and socially congruent billing reversal.

With respect to telephony, the challenge in delivering RPP is both technical as well as behavioral. Conventional service terminates traffic on the destination network incurring cost, and there is little option other than charging the caller. Moreover, given the almost ubiquitous adoption of prepaid service worldwide, reversing call charges in synchronous communication would require interoperable "hot billing" amongst a myriad of proprietary vendors to debit the recipient in near real time. Behavioral aspects are equally daunting. Since it is permissive based, conventional RPP is an inherently stigmatized protocol.

CPP naturally lends itself to store and forward technologies such as voicemail, permitting callers to pay for and deposit a message and recipients to freely withdraw. While voicemail is in essence the catch all to a failed conversation, it has recently evolved into a secondary, half duplex, voice offering that permits callers to unobtrusively deposit a recorded message on an originating network, that is then made locally accessible to the recipient on the terminating network, addressing the technical interconnect and the social "hit and miss" nature of the legacy service.

This new voice capability is delivered on the widespread deployment of Internet Multimedia Service gateways and Private Branch Exchanges (IMS and IPBX), which permit local telephony access to remotely stored data, delivering what could be termed a "voice browser". Voice Short Messaging Service (VSMS) is one such industry development well known to those skilled in the art. The principal attraction is in permitting a caller to deposit a short voice message to a called party, without ringing the destination, a capability that has come to be known as "ring free" messaging.

However, the "ring free" capability is not free of cost. The caller is still charged a cost for depositing the message. There is currently no known way for users, particularly the large number of low income users, to deposit a message for free (i.e., without incurring a cost). Specifically, there is no known way to remove a charge imposed upon a sender under the CPP billing protocol.

SUMMARY OF THE INVENTION

This application discloses a method, implemented at least in part by a computing device, that can be used to bill a communication. The method includes terminating a teleservice request at an intermediary node, wherein the teleservice request is associated with a sender and a recipient; receiving teleservice content transmitted by the sender, wherein the teleservice content is received at no charge to the sender; receiving a request transmitted by the recipient to access the teleservice content, wherein receiving the request includes charging a fee; and sending the teleservice content to the recipient.

BRIEF DESCRIPTION OF THE DRAWINGS

Various embodiments of the invention are described herein in by way of example in conjunction with the following figures, wherein like reference characters designate the same or similar elements.

DETAILED DESCRIPTION OF THE INVENTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

As explained in more detail herein below, according to various embodiments, the disclosed system and method seamlessly reverses teleservice charge from CPP to RPP on asynchronously managed content. The system and method permits free user-generated content to be deposited at no cost to the sender, while charging the recipient to access and/or withdraw the deposited message. The system and method also permits both user and network invocations of a new billing and service treatment and further extends service delivery to both the telephony and text messaging domains.

The new billing and service treatment disclosed herein unveils a powerful new cellular dynamic in allowing a free deposit of a message and charging the recipient to access the message. This allows the masses of low income individuals to send freely, while simultaneously preventing them from receiving via the same communications protocol. This has a deliberate effect of redirecting all return messaging from B to A via the profitably established conventional teleservice billing and treatment.

The likely result is a dramatic and sustained increase in conventional call completion on callback, that generates net positive inbound (terminating) revenues for the sending network A which permits the free deposit, incremental revenue for the receiving network B on withdrawals, and overall increase in spend on returns for the industry as a whole. Reversing the teleservice billing protocol from CPP to RPP in accordance with the disclosed system and method, can be an economic elixir that magically generates "dollar one returns on dollar zero deposits".

Advancing teleservice charge from CPP to RPP is tenable given the half duplex nature of the disclosed communication, which introduces service discontinuity between sender A and recipient B, both with respect to telephony voice and text messaging. Since the asynchronous protocol has two originating legs (the uplink to deposit and the downlink to retrieval) ordinarily this would result in two "negatively charged terminals" using the CPP standard.

However, as with all currency systems one requires polarity in order to generate flow, where one terminal is positive the other is required to be negative to create the potential. In cellular communication systems the flow is around "air" (talk time consumption) and the resultant revenue generation. Clearly, two negatively charged terminals, A (−) and B (−), where both deposit and withdrawal incurs a fee, would repel service adoption even further.

As disclosed, the current state of the art in VSMS billing has the terminal polarity configured with A as the negatively charged party and B the positive, and, in attempting to generate current backwards, from minus to plus, the service consequently suffers from dramatically restricted flow. This reverse salient places severe industry drag on mass service adoption.

Unlike computers and billing systems that govern hard dollars and cents, telephones govern human relationships, and consequently an important factor in the current service billing and treatment is behavioral. Charging the sender creates impedance at the source rather than at the destination, where resistance tends to crumble since, once a sender has deposited a message, the decision to complete the transaction by retrieving the message can be more emotional than financial.

Unlike "real time collect," where one party holds the line awaiting approval from the other, the disconnected nature of the teleservice protocols described is both interoperable (network billing system independent) and interpersonal.

At first glance, the disclosed reversed billing treatment seems commercially untenable, and doubly so with respect to Operator A, who would not only forego earning upfront on the deposit, but would enable Operator B to earn money on the withdrawal. In charging A to deposit and permitting B to withdraw without charge, however, the current VSMS industry results in a zero sum back-and-forth game. Moreover, when A and B are on different networks, there is a negative return of service, since notifications to the recipient incur the interconnect terminating penalty:

A pays to deposit 1st message
B withdraws free and replies to A
A withdraws free and replies to B and so on . . .

Artificial service barriers have had to be erected to circumnavigate the architectural misalignment in the current conventional CPP service. Currently where sender pays to deposit, recipients are permitted to withdraw the message free, only to suddenly incur tolls on the same free call when choosing to reply. Similarly, recipients incur charges on subsequent withdrawals to previously played messages. Aside from virtually redeploying the access billing engine and protocol to cater for these design anomalies, the more costly and persistent affliction is in the user experience lacking uniformity.

Allowing free deposits and requiring payment to withdraw ensures mass service adoption by waiving the sender fee and completely recharacterizes the entire VSMS industry and the value proposition. By the disclosed invention, sender A is perceived as the cost sensitive party, transforming VSMS into a hybrid and collaborative service with (1) unidirectional free message deposits from A to B followed by (2) conventional paying teleservice returns from B back to A.

It is recognized that people at the lower layers of the socio-economic pyramid are cash strapped, whereas those higher up are time constrained. The disclosed new billing treatment and the communication protocol it instills affords B the opportunity to return to A when time is on hand. Furthermore, the managed content deposited lends context to the callback, and since A is the requesting party, return by B is nearly always answered. The likely result is a significant increase in both call completion and call duration.

Once the "AB relationship" is established the new communication protocol is implied. If recipient B inadvertently deposits a free message back to A using the new disclosed treatment, the "AB protocol" is simply reset with an additional free message deposit from A to B—for example, "I am on empty. Cannot retrieve message . . . Call me."

In reversing the charge, the disclosed system and method operates to normalize service. The nature of the redefined communication protocol is now not merely asynchronous, but is intentionally asymmetrical, with unidirectional deposits beginning the communication. Further and fundamentally, the disclosed system and method enables the many low-income and yet to be connected users, who cannot afford service no matter how low the cost, to freely participate:

A deposits free message
B is notified and pays to withdraw
B returns via conventional service
A and B are connected with B paying for A The effect can be dramatic: mass viral behavioral economics. The whole network view on the disclosed new billing treatment becomes short (e.g., 30 second) deposits and extended (e.g., 10 minute) returns. Since it is cheaper to deposit a short voice message on the home network than it is calling the party direct, especially when the receiver is on a different network, reducing service cost is viable.

However, a strategic misconception is that there is constant elasticity in price, that the less a service costs the more users will adopt it, when in fact the biggest gap in any service is between one that costs a penny and one that is given away free (i.e., the penny gap). There is a huge psychological difference between cheap and free, between "almost zero" and zero. Zero is one market, everything else is another, and giving a service away is often the difference between a massively successful service and a mediocre one at best. However the caveat and challenge is in figuring out how to convert the mass potential generated by going free into sustainable and profitable service.

While the "economics of free" is the hallmark of the Internet, there is more to success than simply gaining critical mass. The web, while massively free, has yet to break even. Mobile is infinitely more fluid. It is more personal and more profitable, having "pay to use" as the DNA. This last private communications channel is further uniquely characterized by the peer nature of the A and B connection, and introducing discontinuity in the service model as disclosed, by "disconnecting delivery," affords the unparalleled opportunity to spark the gap on servicing source A free, while charging destination B.

Signaling the network, and in the exemplary signaling "Star in the originating phase of a telephony connection" to differentiate service between A and B, is the subject matter of Patent Application WO2005006725, incorporated herein by reference. With the now almost universal adoption of the Star (*) dialed user invocation method to differentiate VSMS from conventional telephony, the disclosed new billing and service treatment uniquely realigns the industry with a powerful new marketing theme: "Star dial to talk and text free." In a reversed "call me" context, B can now colloquially invite and accept A "collect" by sending the message "Star me" (*me).

The exemplary notifications on the resultant deposits by sender A to recipient B are:

| new * text | new * voice |
|---|---|
| read @ | listen @ |
| (internet link) | (telephony link) |

Symbolic addressing schemas lend themselves to establishing industry standards and new business rules as evidenced by the disclosed new billing treatment. With VSMS where the dial code to deposit is local to the home network and now universally "star" amongst operators, and where retrieval is via local dialed access for the recipient, reversing the teleservice billing protocol as disclosed is readily achieved: (1) all star dialed calls and star text deposits are now rated to zero and (2) all access calls to withdraw adhere to the standard CPP model.

The disclosed ability for free deposit adds markets to VSMS. Cells at the current fringe of the cellular industry and users at the bottom of the socioeconomic pyramid can be permitted to make free deposits and freely receive returns via conventional teleservice treatment and billing. Low-income individuals can thus communicate with the world in "half duplex" fashion, driving significant new callback to the sender using conventional teleservice methods, since they themselves cannot afford to retrieve.

As a principal communication mode for the unconnected billions, user invocation of the disclosed new treatment can yield stellar network effects, spreading spectrum since the asynchronous deposit consumes only marginal resources on the cellular uplink (originating wireless spectrum) with the downlink (recipient retrieval) being spread over time. The asynchronous deposit and withdrawal may thus increase overall call density from the whole network point of view. Also, as explained in more detail herein below, since a service node utilized in the disclosed new treatment is fixed, the entire disclosed service delivery may be considered the definitive Fixed Mobile Convergence (FMC).

Given the asynchronous managed nature of the service, where messaging frequency and duration may be controlled centrally by the network, service is both sustainable and scalable. For example, when accepting zero cost deposit on telephony connections, VSMS typically restricts messages to 30 seconds. With zero income generated on deposit and payment only achieved on withdrawal, limiting the A party call duration both contains network resource consumption and mitigates overall revenue erosion that could occur when a sender is given unlimited recording and the recipient only partially retrieves.

Conversely, with the recipient paying to retrieve, additional third party content and sponsorships may be injected into the original message presentation, extending the B session by delivering advertising and marketing collateral to a highly captive audience. A media aggregator may then sponsor the cost incurred by B on retrieving the original message deposit by A.

Sponsoring the service by marketing to the economically empowered recipient B, who pays to retrieve, is completely viable. Presenting the same to the low-income sender A would result in extremely low conversions. Thus, while it is possible to reduce the cost of withdrawal to zero on the disclosed advertising and sponsorship, doing so may negatively effect the overall revenue generated.

The salient is forcing the penny gap on withdrawal, thus ensuring unidirectional deposits between A and B that result in conventional returns between B and A. With third party sponsorship the charge to withdraw could likely be lowered to a sustainable "penny per minute," without permitting the entirely free service that would harm conventional teleservice returns (where the real economic proposition presents). And while rudimentary signaling is possible between two zero A and B cells, the nature of the disclosed protocol saturates on the first communication because core logic in the servicing node can easily determine that both A and B are without funds and, until such time as either party activates a link to retrieve, further communication between them can be disabled.

Given the potential dramatic shift in service adoption and utilization by reversing the billing protocol as disclosed, the exemplary outcome thus paradoxically advances the industry by regressing service, reducing it from one that supports bidirectional deposits (where recipients can deposit a message back to the sender simply by replying to the message retrieval) to one that singularly permits A to leave a message for B, followed by conventional conversation on the B to A return. The resultant combination delivers a uniquely adopted service hybrid.

Figure 1:
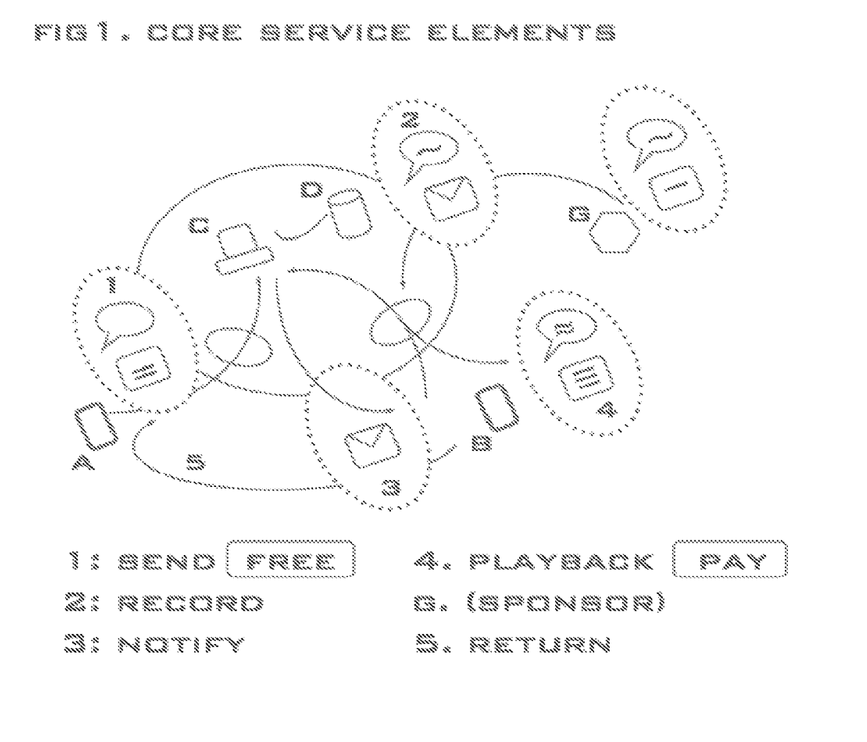
FIG. 1 shows core service elements of a telecommunication system according to various embodiments.

FIG. 1 shows core service elements of a telecommunication system according to various embodiments. The system may be utilized to implement a method which allows sender A to deposit teleservice content for recipient B at no charge to sender A. The teleservice content can be either a text message (such as a short text message (SMS)) or a voice message (such as a short voice message (VSMS)). Describing the user invoked VSMS deposit first:

Step 1: The Invocation. Sender A initiates a teleservice request associated with a sender A and recipient B. According to the invention, a teleservice request can be an SMS transmission or a telephony connection request. In this embodiment, the teleservice request is a telephony request. Sender A addresses the teleservice request by prepending a network supported service routing prefix to the recipient B's telephone number. In the exemplary, the prefix is the universal star (*) symbol, located at row 4 column 1 in the standard cell keyboard matrix.

To deposit a free VSMS, sender A then presses "Send" to connect and the teleservice request is routed via the Mobile Switching Center to the intermediary servicing node C, where the call can be answered by an automated IVR (Interactive Voice Response) system. The teleservice request results in the intermediary servicing node C receiving the teleservice content transmitted by the sender at no charge to the sender.

The teleservice request is terminated at the intermediary servicing node C. The termination can be based on information in the telservice request, such as the routing prefix. Terminating the teleservice request can also include modifying the teleservice request and terminating the teleservice request at the intermediary servicing node C based on information in the modified teleservice request, such as information that sender A is unauthorized to complete a conventional teleservice request due to insufficient credit available. The termination of the teleservice request based on the modified teleservice request can also be based on a routing prefix in the modified teleservice request.

Step 2: The Deposit. Sender A is prompted for the teleservice content, a voice message in this embodiment. Once the message has been recorded, the VSMS containing teleservice content is stored at attendant servers D.

Step 3: The Notification. Node C can then notify recipient B of the teleservice content, for example, by sending an SMS message that includes a telephony link to the deposited message. In the exemplary, the SMS notification source address is set to the sender A telephone number, so that the message received may display the sender name, when the sender number has been previously recorded in the recipient mobile address book.

Step 4: The Withdrawal. Recipient B can transmit a request to intermediary service node C to access the teleservice content, and the request can result in the charging of a fee. The teleservice content can then be sent to the recipient. In this embodiment, recipient B activates the link and is connected via telephony gateway to node C where the deposited message is played back. In the exemplary, all outstanding messages from sender A are linked. Recipient B can be charged for the request to access the teleservice content (the message). If, however, the message deposited by sender A is NUL (empty), the resultant content displayed to recipient B on withdrawal can be a generic message, such as, "CALL ME."

Step 5: The Return. Recipient B can dial sender A directly to reply to the message deposited and retrieved. In the exemplary, the option to reply directly to message deposit via node C is decommissioned. The return call is thus switched and routed using conventional billing and service treatment (logical path shown).

Optionally, at Step 4, a third party can be charged for the request to access the teleservice content. During message playback, node C connects to content aggregator G (via standard Internet Protocols and Scripting such as HTTP and VoxML, not shown) and associates third party content, such as sponsorships, with the teleservice content. The third party content can be sent in response to the request transmitted by the recipient to access the teleservice request. This third party content is, in the exemplary, short duration marketing and advertising sound bytes that either precede or follow the original message deposit from sender A. The content can be passively played and presented to B without interaction, or the content can actively accept interaction and input from B that is recorded for future reference.

For example, lightly announcing a new product to B prior to playing the message deposited by sender A delivers frictionless subliminal marketing. Telephony is highly suggestive tympanic channel, received directly into the inner auditory canal and as such is an extremely influential receptacle and medium. Alternatively presenting "2 click interactions" on highly distilled interactions directly after playing the original message from A to B can return near instantaneous results from cellular pulse surveys ("Do you support . . . ? 1/Yes. 2/No").

Describing the user invoked SMS deposit with reference to FIG. 1:

Step 1: The Invocation. Sender A addresses the free SMS message by prefixing the recipient B telephone number with the network supported service prefix. In the exemplary, the prefix is the universal star (*) symbol.

To deposit a free SMS, A then types the message using the standard message creation service in the mobile telephone and presses Send. The SMS message is routed to node C as detailed in FIG. 3 below.

Step 2: The Deposit. Once the message has been received at node C, the SMS is stored at attendant servers D.

Step 3: The Notification. Node C then notifies recipient B, typically by sending an SMS message that includes an internet uniform resource locator (URL) link to the deposited message. In the exemplary, the SMS notification source address is set to the sender A telephone number, so that the message received may display the sender name when the sender number has been previously recorded in the recipient mobile address book. Presenting personalized links to personal content is critical for mass mobile data adoption and consumption.

Step 4: The Withdrawal. Recipient B activates the data link by clicking the internet URL embedded in the notification and is connected via the embedded or selected Internet Browser on device B, to web compliant servers D, where the deposited message is presented. In the exemplary, all outstanding messaged from A are linked. B is charged for the data connection and transport required to access the original text message.

Figure 4:
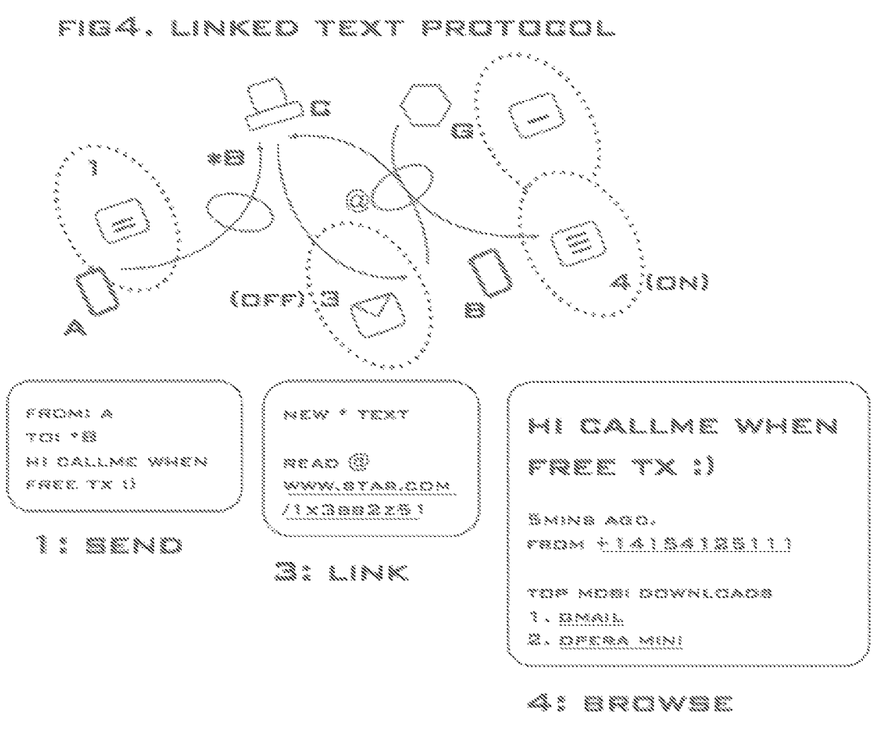
FIG. 4 shows an exemplary linked text messaging protocol according to various embodiments.

Step 5: The Return. Recipient B ends the browser session and replies via the conventional Mobile Originated SMS service back to sender A (logical path shown). Alternatively, B can dial sender A directly, to reply via voice. The link to the callback may be presented in the browser as shown in FIG. 4 below.

Optionally, at Step 4, node C connects to content aggregator G (using standard Internet Protocols and Scripting such HTTP and HTML, not shown) and introduces third party information and links on the page that presents the original message in the browser. This content, in the exemplary, highlights key industry developments and services.

One of the most challenging aspects to mobile data software developers is gaining product visibility. The ability to seamlessly link third party content directly into a mass mobile market messaging stream, delivers a priceless wireless real estate and billboard. For example, permitting recipient B to submit their "favorite mobile application" delivers a user rated "top10 listing", which is instantly presented to a global user community, with "2 clicks" download to products showcased.

Figure 2:
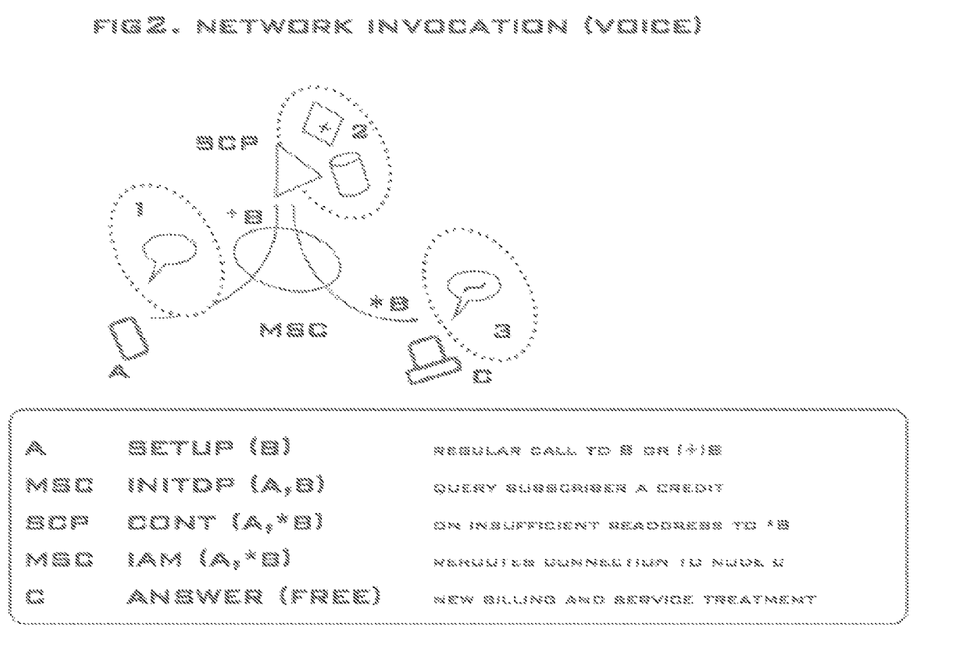
FIG. 2 shows an exemplary network invocation for voice telephony according to various embodiments.

FIG. 2 shows an exemplary network invocation for voice telephony according to various embodiments. The disclosed service permits both user and network invocation. FIG. 1 above described user invocation. FIG. 2 shows various embodiments of network invocation to depositing a free voice message (network invocation to depositing a free SMS message follows with FIG. 3 below):

Step 1: The Invocation. Sender A requests conventional telephony service by entering regular recipient B telephone number and pressing send to connect.

Step 2: The Exception. In accordance with the Originating Basic Call State Model (BCSM) and associated Detection Points (DP) well understood by skilled Intelligent Network artisans, the Mobile Switching Center (MSC) on determining that the sender is unauthorized to access the requested teleservice (DP: Authorize_Origination_Attempt) switches and routes the teleservice request directly (not shown) to node C for the disclosed new treatment. For authorized users, the MSC on encountering DP Analyze_Information, requests call processing instruction from a Service Control Point (SCP), as shown, prior to continuing routing the connection request towards the final destination.

On encountering DP2, the MSC assembles and sends an Initial Detection Point message (INITDP) towards the SCP. This message contains among other information, the source and destination addresses (A, B). SCP queries the associated subscriber database and applicable call rating tables, and determines whether A has insufficient credit to complete the telephony request or is otherwise unauthorized to complete a conventional teleservice request. If the teleservice request cannot be completed, SCP automatically modifies the B party address information, in the exemplary by "starring the address" (adding a star prefix) and instructing the MSC to "Continue" processing the now modified call setup. That is, whereas the INITDP presented (A, B), the now modified call continued is between (A, *B).

Step 3: The Switch. On receiving the continuance, MSC routes and completes the now star prefixed Initial Address Message (IAM), on a resultant call path away from conventional service treatment, towards node C, where the new service treatment and billing follows the VSMS service description in FIG. 1 above (Step 2 through 5).

Network invocation thus delivers seamless switching between conventional service billing and treatment for telephony users that have sufficient credit and the disclosed new billing and service treatment when credit is depleted. In the exemplary, node C would simply present a modified ring ("Star Ring") to signal the alternate free method engagement and immediately answer the call for message deposit and delivery. Given the mass messaging volume generated on free deposits, absolute minimal interaction between A and node C is preferable. In the exemplary, in addition to a greeting by the recipient B (when the messaging service has been personalized), a simple identifiable tone emitted at the beginning to signal "recording" and similarly, seconds before reaching the maximum duration to signal "ending" would suffice.

Figure 3:
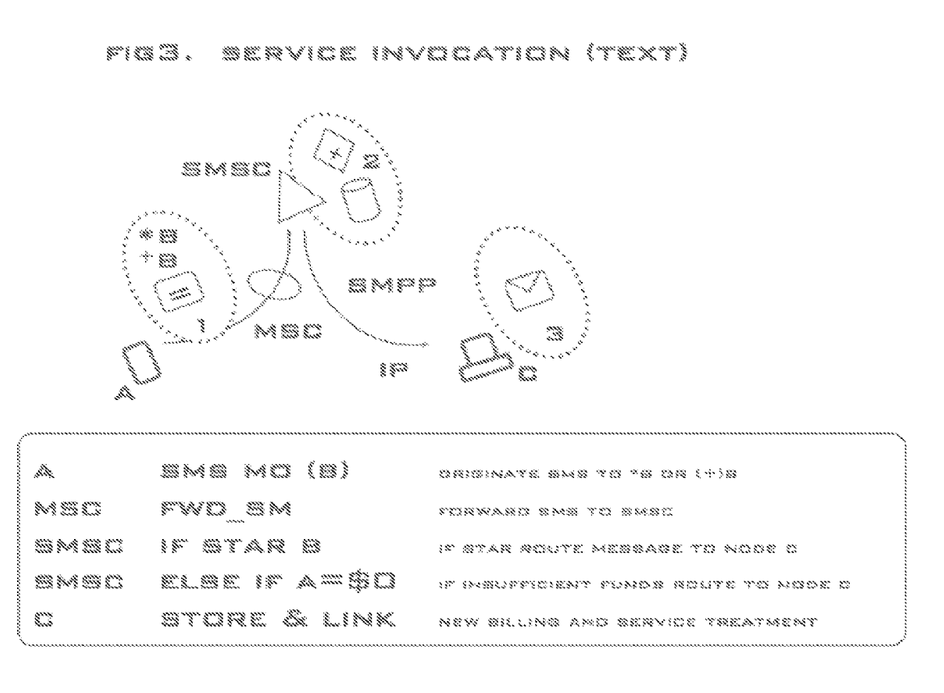
FIG. 3 shows an exemplary short text invocation method according to various embodiments.

FIG. 3 shows an exemplary short text invocation method according to various embodiments. Both the user and network invocation to depositing a free SMS message are shown. Firstly, expanding on the description in FIG. 1 above, with respect to the exemplary user invocation:

Step 1: The Invocation. Sender A sends a free Mobile Originating (MO) SMS message to B in the exemplary by prefixing a star to the regular B telephone number. Instead of MO, the teleservice request can also be Internet Originating.

Step 2: The Treatment. MO SMS transmission through the mobile network is well understood by those skilled in the art, and in particular the SMS call path that delivers the SMS to the Short Message Service Center (SMSC) for delivery. On receiving an SMS transmission from mobile sender A, the servicing MSC, on validating subscriber credentials, performs a "forward short message" (MAP FWD_SM) towards the SMSC, where the message is processed for delivery.

SMSC functions include prepaid billing verification, storing and then forwarding the SMS message to mobile recipient B. On determining that sender A has "Star addressed" the message, conventional billing verification is bypassed and the message is forwarded via standard SMPP (Short Message Peer to Peer) Internet Protocol to a receiving port at node C, where the new treatment follows as described in FIG. 1 above (Steps 2 through 5).

To the skilled artisan, it will be evident that alternative methods and paths routing the Star addressed message to node C are possible. In one such alternative embodiment, all Star prefixed messages are directly forwarded to node C by the MSC using MAP primitives over the SS7 signaling network, since billing verification as per the disclosure is no longer required. In yet another embodiment, Star addressed messages may be captured directly by monitoring signaling links between the MSC and the SMSC. Irrespective of the path to node C, once the SMS message arrives at the intermediary node, the new billing and service treatment continues as described.

Continuing with FIG. 3, to describe the exemplary network invocation:

Step 1: The Invocation. Sender A requests conventional SMS MO service by addressing a short message entered on the mobile device to a regular recipient B telephone number and pressing send to transmit.

Step 2: The Exception. As in Step 2 above, the SMS follows conventional SMS treatment, and is forwarded through the network to the SMSC. On determining that sender A has insufficient credit to complete the SMS message delivery to recipient B, the SMSC completes the alternate service treatment as described in the exemplary user invocation method above.

Network invocation on the disclosed new SMS treatment delivers frictionless messaging from A to B regardless of credit availability. Sender A remains wholly within the cellular text domain, sending and receiving free, while B pops in and out of the internet data cloud to retrieve. Moreover, linking text via the internet as disclosed elevates the medium from plain to rich text format, where standard web scripting delivers an enhanced presentation to the recipient and where linking third party content into the mobile originated stream weaves a highly threaded mobile tapestry.

FIG. 4 shows an exemplary linked text messaging protocol according to various embodiments. Exemplary screen flows highlight the process:

Step 1: The Origination. Sender A originates SMS message, in the exemplary to star addressed recipient B.

Step 2: The Deposit. This step follows the descriptions in FIG. 3 above.

Step 3: The Notification. Node C notifies recipient B that a new "star text" has been received, providing an Internet link that references the original message deposit. The link displayed is simply illustrative, depicting a domain name (star.com) followed by a link message identifier (1x3BB2Z51) generated by node C that uniquely references the sender A message with recipient B, as stored at attendant servers D.

In the exemplary, node C suspends additional "star text" notifications (indicated by the reference "3 OFF" in the diagram) until recipient B has activated the link and retrieved the message(s) waiting, whereupon notifications are once again resumed ("4 ON"). While the browser session described in Step 4 is active, any new messages deposited to recipient B can be notified directly within the browser rather than transmitted using SMS. Since notifications may incur terminating charges, this optimized method consolidates notifications.

Step 4: The Presentation. On activating the Internet Link presented in Step 3, the mobile device launches the embedded or selected Browser application passing the link parameters described. This opens an Internet connection to attendant servers D and presents the original message from A, together with additional content linked and provided by aggregator G.

It should be evident that further personalization of the Browser screen presented is simply attained. In particular, on the mobile side of the messaging equation, sender A may personalize service to B by, for example, sending a star addressed message to himself—that is, sender A sending a message to his own starred mobile number with the content being his name. This "revertive addressing" permits node C to treat any SMS "from A to *A" distinctly from others and, in this instance, to store the sender name for personalizing the message presented in the browser to B. Node C may inform sender A as to this personalization feature in a welcoming message to first time users.

Figure 5:
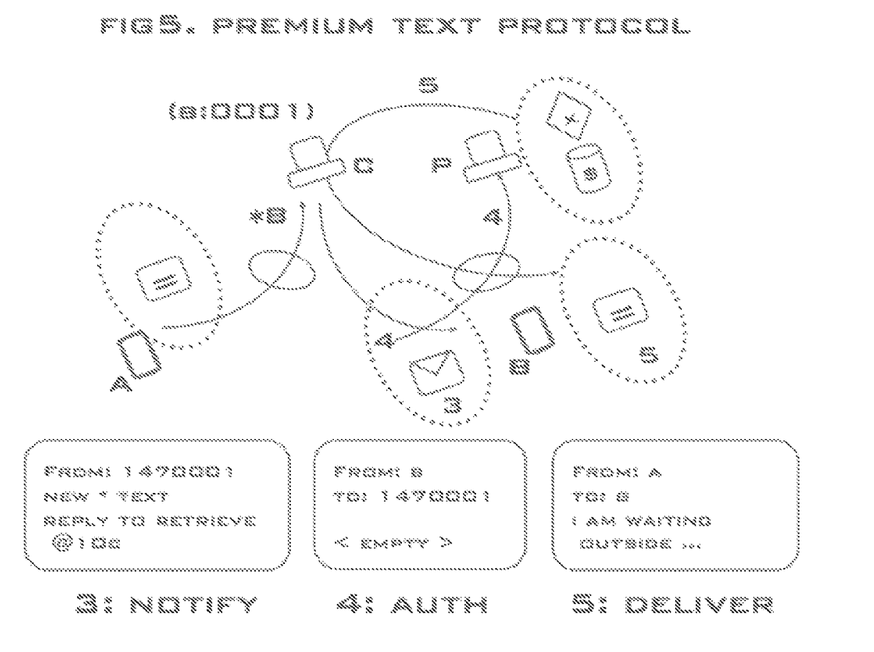
FIG. 5 shows an alternate premium text message protocol according to various embodiments.

FIG. 5 shows an alternate premium text message protocol according to various embodiments. Premium rate access to the original message content is described:

Step 1: The Origination. Sender A originates an SMS message, in the exemplary to star addressed recipient B.

Step 2: The Deposit. This step follows the descriptions in FIG. 4 above.

Step 3: The Notification. Node C associates a sequence number with the message received from A to recipient B (for example "B:0001") as a message retrieval index, sends a notification message to recipient B together with "advice of charge," referencing this index together with a premium rated SMS billing service return address, Node P. This combined premium rate service address and message retrieval index is set as the notification message source address to redirect replies authorizing reverse billing to Node P.

As is well known to artisans skilled in SMS messaging, premium rate SMS services function on operator short codes. In this alternate embodiment, by simply adding message sequencing digits to the short code, the notification reply would link directly to an individual message for retrieval without disturbing return message routing on existing short codes. In this example, where a premium rated messaging service code is "147", such a message notification would have source set to "147n", where on reply, the "n" numeric digits uniquely and logically map back to "a specific message awaiting delivery to B", at node C.

Since the notification carries this index on the reply roundtrip from B, whose identity is thus captured in the reply, the mapping back to the original message deposited by A at node C is complete. The premium notification instructs B to reply, at reverse mobile terminated premium ("10c" for example) in order to retrieve and thereby pay for the original text message from A. In being a premium rated service, the sender A's identity would preferably be included in the notification (as shown below). The identification can be based on the recipient's historical message access and retrieval patterns. Further, the notification can be delivered only for the first teleservice request deposited from A, wherein notification for additional teleservice requests from the same sender A are suspended until recipient B accesses the teleservice content of the first teleservice request. Alternatively, the notification can omit the sender A's identity to encourage B to retrieve the message to ascertain the sender's identity.

Step 4: The Authorization. B replies to the premium notification, in the exemplary without having to specify a service "keyword", in the body of the reply text. Conventionally, keywords are required to "map services to the provider associated with the premium offering," however, in this instance, the absence of a keyword (that is, receiving an empty message reply) would default service to node C and the disclosed treatment.

On receiving the empty reply from B, Node P performs a billing verification by querying the home operator subscription database. If B has sufficient funds to receive the original message, Node P instructs node C by transmitting the index number together with the recipient source address (using standard Internet Protocols such as HTTP and HTML, not shown), that the premium rated SMS receipt by B has been authorized, and instructs the database to debit the B subscriber account accordingly.

Replying with text instruction would still be acceptable as default routing authorization to node C would be determined on the extended short code. For example, a simple text menu may be incorporated in the notification that permits recipient B to accept charges for messages deposited by A, in the exemplary, over a timed period (for example, "Collect all messages deposited by A next hour"). Authorizing such a default timed collection, would temporarily suspend notifications and automatically withdraw the original message deposit on each credit verification, delivering a frictionless reverse charged text conversation between A and B.

new * text
14154125111
reply:
A>collect (@10c)
B>collect next hour

Step 5: The Delivery. On receipt of the premium rated message authorization from Node P, node C retrieves the original text message with index number "B:0001" from attendant servers D, and delivers a text message to B, with source set to A. This presents what appears to be a conventionally originated SMS from A to B, permitting standard direct reply. While the exemplary Internet linked protocol, described in FIG. 5 above, creates the demand for data service subscription, this alternate embodiment forgoes the requirement to have a data subscription in order to link to and retrieve the original message deposited.

Figure 6:
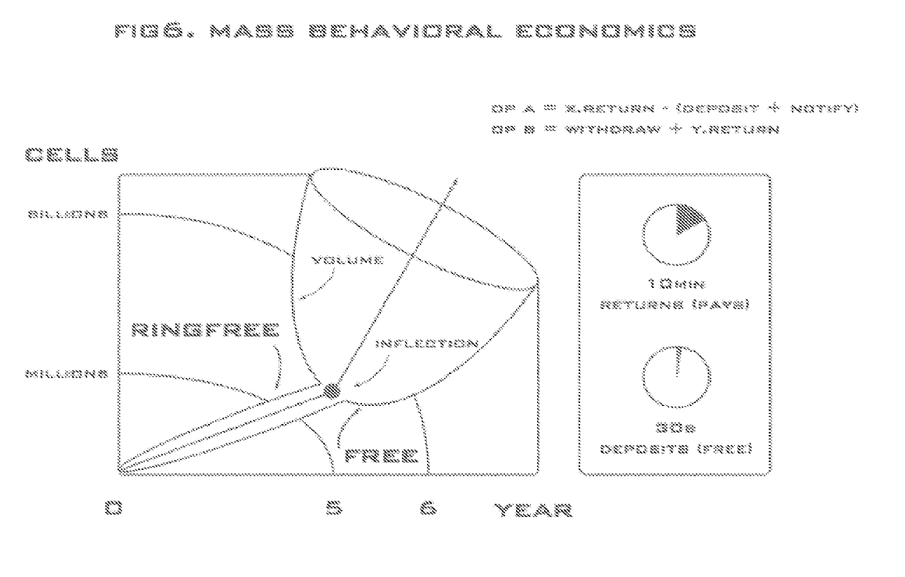
FIG. 6 shows mass behavioral economics of free cellular service.

FIG. 6 shows mass behavioral economics of free cellular service. Inflection is achieved the moment the deposit is made free, resulting in massive service adoption both with respect to users and messaging volume.

Inflections are rare industry phenomena. The first and only other cellular inflection was attained over a decade ago, when intelligent network nodes seamlessly delivered prepaid service on the regular dialed address. Prior to this, prepaid required users to dial "into and then out of" a service platform. Inflections deliver "orders of magnitude," and what has taken the VSMS industry over 5 years to reach "millions", would with the new billing and service disclosure, now take less than 1 to attain billions.

Describing the diagram in more detail, on the left is a graph plotting the massive service and messaging growth on the free deposit model. Conventional CPP billing treatment has resulted in linear uptake, and linear messaging, "2×N" so to speak. The free deposit delivers a viral "2^N" phenomena that defines cellular propagation.

On the right, the revenue proposition to the new billing and service treatment and the resultant returns via conventional teleservice is clear. Unpacking the Operator revenue equations further:

X.Return=the portion of interconnect revenue that accrues to Operator A on terminating traffic generated by recipient B on returning to A using conventional teleservice treatment.

Y.Return=the portion of interconnect revenue that is retained by Operator B on servicing the return by recipient B, using conventional teleservice treatment. Typically "X exceeds Y by multiples".

Deposit=the marginal cost to Operator B in accepting and depositing the message transmitted by sender A at intermediary node C.

Notify=the cost of notifying recipient B.

Withdraw=the revenue accrued by Operator B on recipient accessing and withdrawing the message deposited by A While "30 second deposits, 10 min returns" is stated, it is exemplary rather than averaged.

Figure 7:
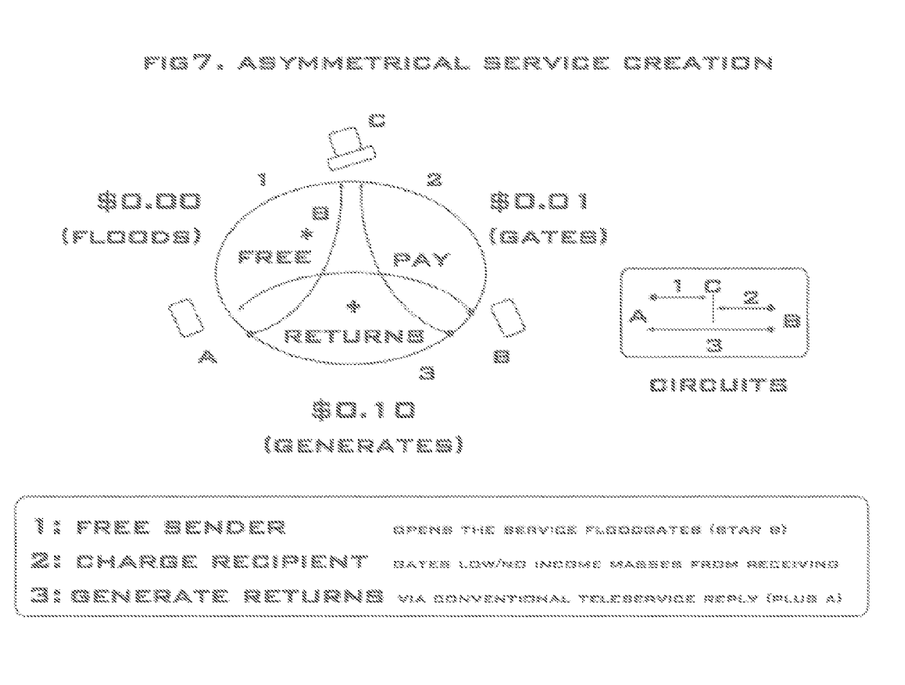
FIG. 7 shows an asymmetrical service matrix according to various embodiments.

FIG. 7 shows an asymmetrical service matrix according to various embodiments. The asymmetrical nature of the service delivers a unique hybrid between the new disclosed billing and service treatment and the established conventional teleservice industry.

With any hydro electric power generating plant, flooding and gating is critical to generating current. This simple schematic applies the same principals to generating quantum new revenue streams on directionally opening then closing the primary "ABC" cellular circuits as per the disclosure.

It is to be understood that aspects of the invention may be implemented by a computing device and/or a computer program stored on a computer-readable medium. The computer-readable medium may comprise a disk, a device, and/or a propagated signal.

It is to be further understood that the invention may assume various alternative orientations and step sequences, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. A teleservice method between a sender subscriber and a recipient subscriber, implemented at least in part by a computing device, the method comprising at an intermediary servicing node:
    (a) receiving an originating teleservice request initiated by the sender subscriber, the originating teleservice request associated with the sender subscriber and the recipient subscriber;
    (b) terminating the originating teleservice request;
    (c) receiving teleservice content transmitted by the sender subscriber;
    (d) notifying the recipient subscriber that teleservice content has been received;
    (e) receiving an access request transmitted by the recipient subscriber to access the teleservice content; and
    (f) initiating sending the teleservice content to the recipient subscriber;
    wherein
        (i) the originating teleservice request is terminated at the intermediary servicing node without charging the sender subscriber; and
        (ii) a party other than the sender subscriber is charged for delivering the teleservice content to the recipient subscriber.

2. The method of claim 1, wherein terminating the teleservice request comprises terminating a telephony connection request.

3. The method of claim 1, wherein terminating the teleservice request comprises terminating a short message service transmission.

4. The method of claim 1, wherein terminating the teleservice request at the intermediary servicing node comprises terminating the teleservice request at the intermediary node based on information in the teleservice request.

5. The method of claim 4, wherein terminating the teleservice request at the intermediary node based on information in the teleservice request comprises terminating the teleservice request at the intermediary node based on a routing prefix in the teleservice request.

6. The method of claim 1, wherein terminating the teleservice request at the intermediate node comprises: modifying the teleservice request; and terminating the teleservice request at the intermediary node based on information in the modified teleservice request.

7. The method of claim 6, wherein modifying the teleservice request comprises automatically modifying the teleservice request.

8. The method of claim 6, wherein modifying the teleservice request comprises modifying the teleservice request based on information associated with the sender subscriber.

9. The method of claim 8, wherein the information associated with the sender subscriber is the sender subscriber being unauthorized to complete a conventional teleservice request due to insufficient credit available.

10. The method of claim 6, wherein terminating the teleservice request at the intermediary node based on information in the modified teleservice request comprises terminating the teleservice request at the intermediary node based on a routing prefix in the modified teleservice request.

11. The method of claim 1, wherein receiving the teleservice content comprises receiving a voice message.

12. The method of claim 1, wherein receiving the teleservice content comprises receiving a text message.

13. The method of claim 1, further comprising storing the received teleservice content.

14. The method of claim 1, further comprising associating third party content with the teleservice content.

15. The method of claim 14, further comprising sending the third party content to the recipient subscriber in response to the access request transmitted by the recipient subscriber to access the teleservice content.

16. The method of claim 1, wherein notifying the recipient subscriber includes a method selected from the group consisting of:
    (a) sending a telephony link to the recipient subscriber; and
    (b) sending an internet uniform resource locator (URL) to the recipient subscriber.

17. The method of claim 1 wherein the party other than the sender subscriber is selected from the group consisting of:
    (a) the recipient subscriber; and
    (b) a third party.

* * * * *

UNITED STATES PATENT AND TRADEMARK OFFICE
CERTIFICATE OF CORRECTION

PATENT NO. : 8,818,328 B2
APPLICATION NO. : 13/370984
DATED : August 26, 2014
INVENTOR(S) : Ari Kahn Page 1 of 1

It is certified that error appears in the above-identified patent and that said Letters Patent is hereby corrected as shown below:

Title page:

The following items should be added:

(86) PCT No. : PCT/US10/45666
    Date: 16 Aug. 2010

(87) PCT pub no. WO/2011/020121
    PCT pub. Date: 17 Feb. 2011

Related US application data:

(60) Provisional application data: 61/234,250 filed : 14 AUG. 2009

Signed and Sealed this
Seventh Day of April, 2015

Michelle K. Lee
*Director of the United States Patent and Trademark Office*